United States Patent [19]

Hirotsuka et al.

[11] Patent Number: 4,501,694

[45] Date of Patent: Feb. 26, 1985

[54] PHOSPHORYLATED SOYBEAN PROTEIN

[75] Inventors: Motohiko Hirotsuka, Izumisano; Makoto Kito, Kyoto, both of Japan

[73] Assignee: Fuji Oil Company, Limited, Osaka, Japan

[21] Appl. No.: 566,024

[22] Filed: Dec. 27, 1983

[30] Foreign Application Priority Data

Dec. 28, 1982 [JP] Japan .................. 57-229416

[51] Int. Cl.³ ............................................. A23J 1/14
[52] U.S. Cl. .................... 260/123.5; 426/656
[58] Field of Search ....................... 260/123.5

[56] References Cited

U.S. PATENT DOCUMENTS

| 2,429,579 | 10/1947 | Horvath | 260/123.5 X |
|---|---|---|---|
| 2,431,119 | 11/1947 | Horvath | 260/123.5 X |
| 2,768,997 | 10/1956 | Reeves et al. | 260/123.5 X |
| 3,674,509 | 7/1972 | Miller | 260/123.5 X |
| 4,322,344 | 3/1982 | Chen et al. | 260/123.5 |
| 4,410,554 | 10/1983 | Sailer | 260/123.5 X |

FOREIGN PATENT DOCUMENTS 57-166939  10/1982  Japan .

Primary Examiner—Howard E. Schain
Attorney, Agent, or Firm—Wenderoth, Lind & Ponack

[57] ABSTRACT

A novel phosphorylated soybean protein showing good functional properties at a wide pH range including an acidic pH range which comprises soybean protein and ortho-phosphate bonded to lysine and histidine residue constituents of the soybean protein, the ratio of bonded phosphorus to nitrogen in the soybean protein being 25 $\mu$g/mg nitrogen or more and the isoelectric point of the phosphorylated soybean protein being pH 3.5 or lower.

3 Claims, 8 Drawing Figures

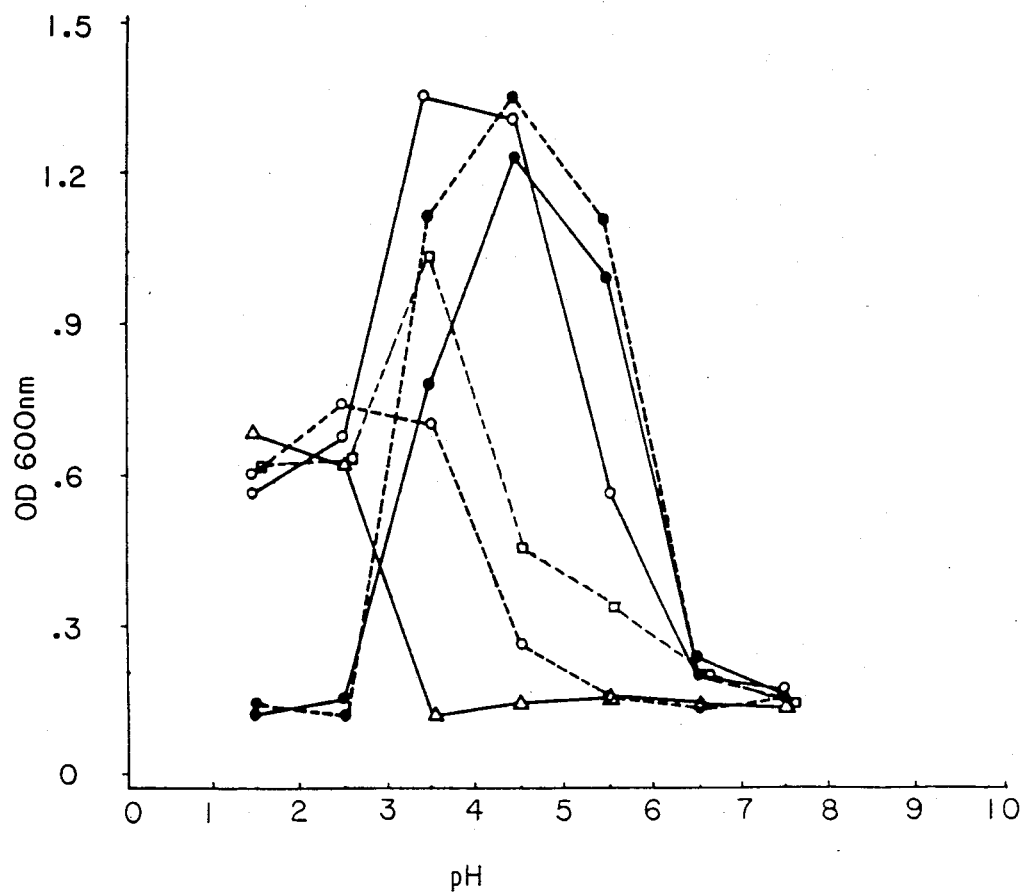

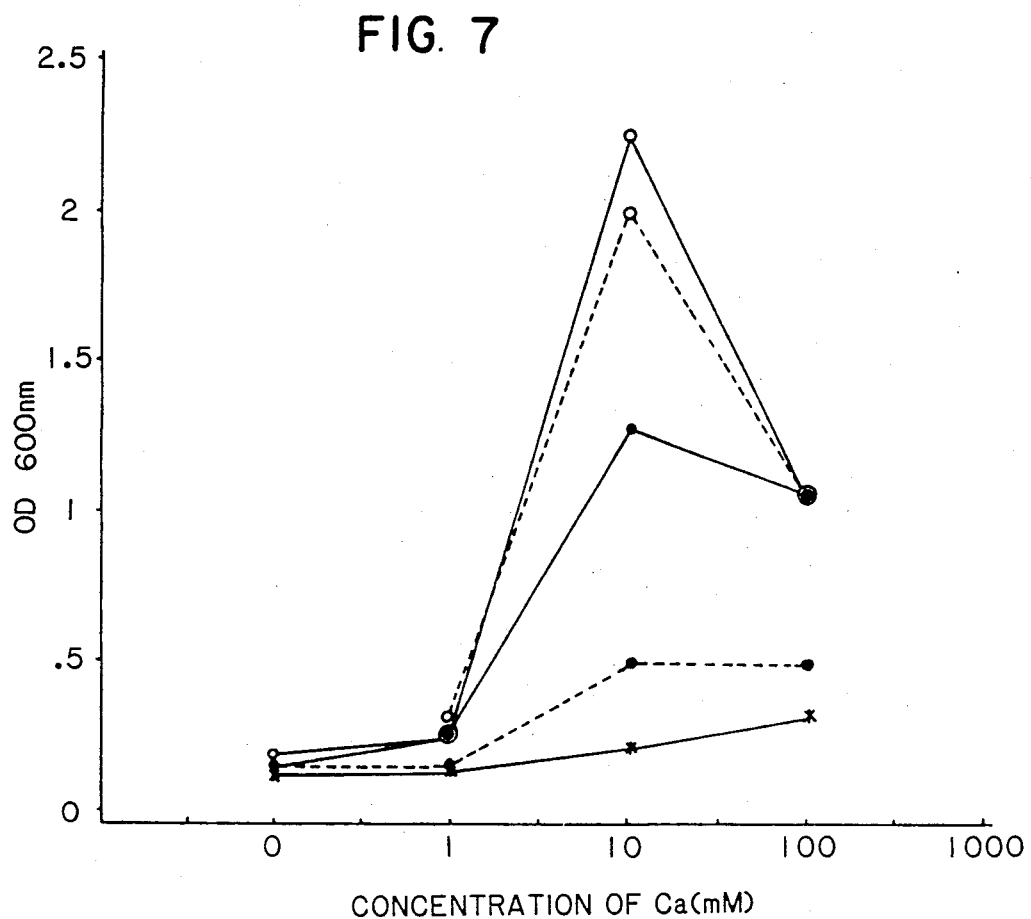

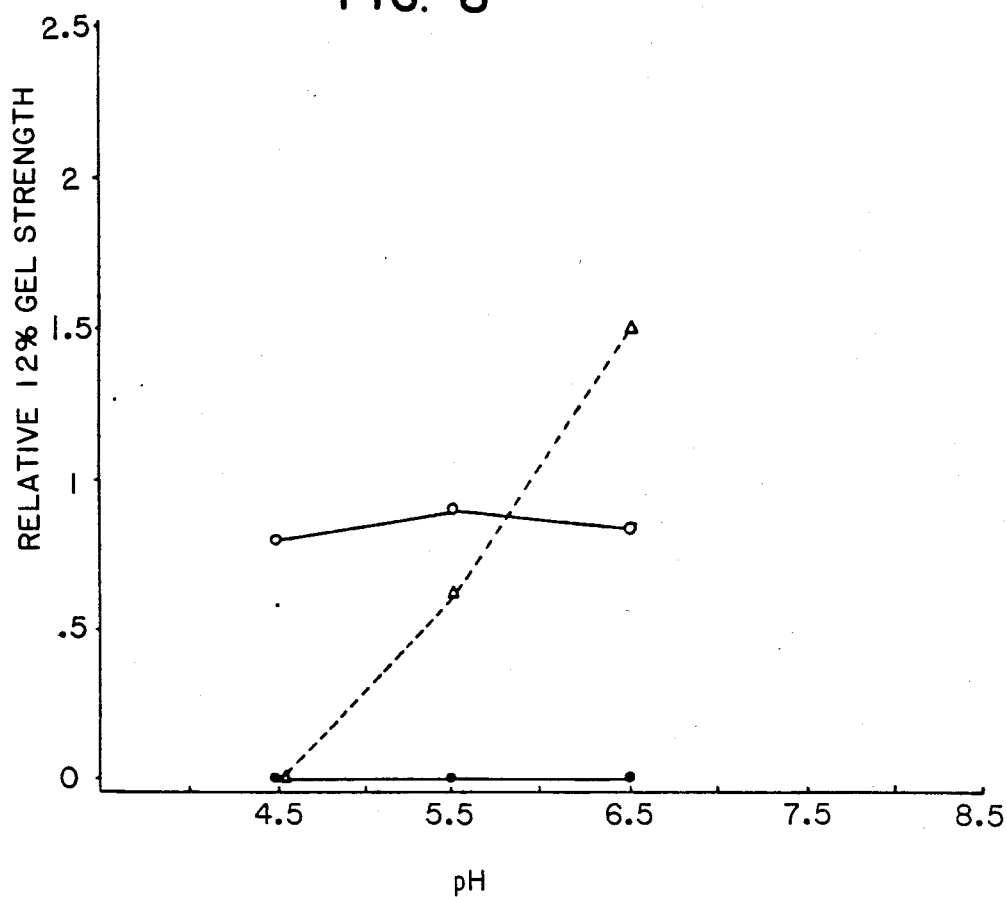

PHOSPHORYLATED SOYBEAN PROTEIN

The present invention relates to a novel phosphorylated soybean protein.

Soybean protein has various good functional properties useful in food processing such as emulsion forming properties, stabilization of emulsion, acceleration of fat adsorption, viscosity control, gel forming properties, elasticity control, foaming properties, film forming properties and the like as well as good nutritional properties such as richness in lysine and high protein score. Therefore, at present, soybean protein is one of the most important food materials and is used in various kinds of food not only as a mere extender but also as a material having positive functional properties.

However, such functional properties of soybean protein are mainly exhibited only at a neutral pH range. Therefore, use of soybean protein at an acidic or weak acidic pH range which is often encountered in food or food processing is limited and it is requested to modify soybean protein so that it can exhibit its good functional properties even at an acidic or weak acidic pH range.

That is, almost all of the above functions of soybean protein are based on its good solubility in water. On the other hand, as a pH value of an environment approaches the isoelectric point of soybean protein (pH 4.2 to 4.6), solubility thereof in water is decreased (at the pH range of 3.3 to 6.0, solubility of soybean protein in water is one half or less of that at a neutral pH range) and thereby the above various good functional properties of soybean protein are deteriorated. Thus, it is requested to provide soybean protein which can exhibit good functional properties similar to those at a neutral pH range, even at an acidic or weak acidic pH range.

As a method for modifying soybean protein to improve its functional properties, it has hitherto been known a physical treatment of soybean protein such as heating, an enzymatic treatment of soybean protein such as enzymatic hydrolysis, a chemical treatment of soybean protein such as phosphorylation and the like. Among these treatments, phosphorylation of soybean protein is disclosed in, for example, U.S. Pat. Nos. 2,429,579 and 2,768,997 and Japanese Patent Laid Open Publication No. 166939/1982. However, in these prior art, modification of soybean protein is insufficient and the modified soybean protein does not fully exhibit its functional properties at an acidic pH range. For example, improvement of solubility at pH 4.5 and lowering of the isoelectric point to pH 3.5 or less are not accomplished in these prior art. In this connection, in U.S. Pat. No. 2,429,579, there is described that phosphoric acid is bonded to soybean protein in the form of tripolyphosphate. In Japanese Patent Laid Open Publication No. 166939/1982, there is described that, although phosphoric acid reacts with serine residue constituents of soybean protein to form monophosphate ester or with free lysine to form triphosphoramidate, the latter is labile and releases free lysine by hydrolysis under weak acidic conditions.

In order to obtain a modified soybean protein having good solubility as well as excellent emulsification properties and gel forming properties not only at a neutral pH range but also at a weak acidic or acidic pH range, the present inventors have intensively studied. As the result, it has been found that a soybean protein highly phosphorylated in the form of ortho-phosphate at specific amino acid residue constituents of the protein has excellent functional properties such as good solubility and gel forming properties at a weak acidic or acidic pH range, very low isoelectric point and the like.

The main object of the present invention is to provide a novel phosphorylated soybean protein which can exhibit its excellent functional properties even at a weak acidic or acidic pH range. This object as well as other objects and advantages of the present invention will become apparent to those skilled in the art from the following description.

According to the present invention, there is provided a phosphorylated soybean protein which comprises soybean protein and ortho-phosphate bonded to lysine and histidine residue constituents of the soybean protein, the ratio of bonded phosphorus to nitrogen in the soybean protein being 25 $\mu$g/mg nitrogen or more and the isoelectric point of the phosphorylated soybean protein being pH 3.5 or lower.

The soybean protein to be phosphorylated in the present invention can be any soybean fraction containing soybean protein. For example, acid precipitated soybean protein, i.e., soybean protein isolate (prepared by acid precipitation of an aqueous extract of soybeans or soybean flour, hereinafter referred to as SPI), soybean protein extract (in addition to SPI, this contains so-called whey components such as water soluble polysaccharides, etc.), soybean protein concentrate (although a whey component content is low, in addition to SPI, this contains water insoluble polysaccharides) and the like can be used. Among these, SPI has a highest protein content and the crude protein content thereof is about 90%. Besides, apparently, acid precipitated soybean protein (soybean globulin) itself is a complex mainly composed of 7S globulin (conglycinin, average molecular weight: about 180,000) and 11S globulin (glycinin, average molecular weight: about 350,000) and therefore the soybean protein used in the present invention is not a single component material. The constituent amino acids of the soybean protein used in the present invention are known in the prior art (for example, "SOYBEANS AS A FOOD SOURCE", p. 39, 1971; "MISO NO KAGAKU TO GIJUTSU", No. 232, p. 7, 1973) and various techniques for detecting soybean protein are also known in the prior art (for example, Japanese Agricultural Standard for hamburger and patty).

The phosphorylated soybean protein of the present invention can be prepared by adding a phosphorylating agent such as phosphoryl trichloride dissolved in hexane or kerosine to an aqueous dispersion of soybean protein maintaining at pH 8 or more, preferably, at pH 10 or more, with stirring and then removing any excess phosphorylating agent. The phosphorylation reaction can be carried out at room temperature and, usually, phosphorylation is completed within 30 minutes. The ratio of the phosphorylating agent to the soybean protein is not limited to specific one but it should be sufficient for obtaining the phosphorylated soybean protein having the ratio of the bonded phosphorus to nitrogen in soybean protein (hereinafter referred to as P/N ratio) of 25 $\mu$g/mg nitrogen or more. When P/N ratio is less than 25 $\mu$g/mg nitrogen, the resulting phosphorylated soybean protein merely shows isoelectric point and solubility behavior similar to those of a conventional phosphorylated soybean protein. Usually, the maximum P/N ratio of the phosphorylated soybean protein of the present invention is about 90 to 95 $\mu$g/mg nitrogen.

The phosphorylation reaction mixture can be worked up by a conventional method such as gel filtration or dialysis to obtain the desired phosphorylated soybean protein in liquid. If necessary, it can be converted in the form of concentrate or powder by a conventional method.

In the phosphorylated soybean protein of the present invention, phosphorylation takes place at the sites of lysine residue and histidine residue constitutents in the protein in the form of ortho-phosphate as shown in Example hereinafter. The isoelectric point of the phosphorylated soybean protein is pH 3.5 or lower, usually, pH 3.5 to about 1.5.

The phosphorylated soybean protein of the present invention can exhibit good functional properties at a weak acidic or acidic pH range as well as at a neutral pH range and thereby it is very useful for food materials.

The preferred embodiment of the present invention is illustrated by the following Example and Experiment with reference to the accompanying drawings in which;

FIG. 6 is a graph illustrating turbidity of a dispersion of the phosphorylated soybean protein sample or the starting SPI sample having 0.1% solid content;

FIG. 7 is a graph illustrating the relationship between turbidity and calcium concentration; and FIG. 8 is a graph illustrating gel strength of various soybean protein at an acidic to neutral pH range.

EXAMPLE

Preparation of SPI

Hot water (50° C.) was added to defatted soybean flour (NSI=88, crude protein content 50%, oil content 0.7%; flour/water=1/12 by weight). The mixture was stirred for 1 hour to extract soybean protein and centrifuged at 3,000×G for 10 minutes to remove insoluble residues. The supernatant was adjusted to pH 4.5 with 1N HCl, allowed to stand at room temperature for 30 minutes, and then, centrifuged at 3,000×G for 10 minutes to give an acid precipitated fraction. To the fraction was added about 10 fold of water. The mixture was homogenized and again centrifuged at 3,000×G for 10 minutes to precipitate SPI.

Phosphorylation of SPI

Figure 1:
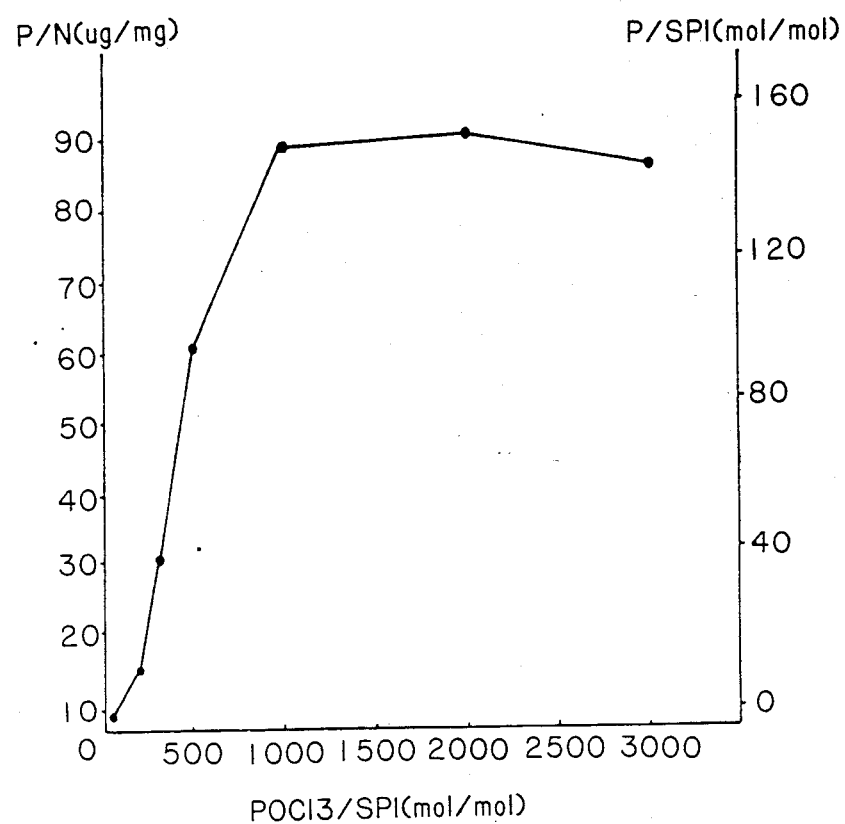
FIG. 1 is a graph illustrating the relationship between the amount of $POCl_3$ to be added to SPI and the phosphorylation degree.

Water was added to SPI thus precipitated in such an amount that the solid content of the resulting SPI dispersion was 4% and pH of the dispersion was adjusted to 11.0 with 5N NaOH to give SPI solution. To the solution was added $POCl_3$ with vigorous stirring. The addition of $POCl_3$ was effected by dissolving $POCl_3$ in 10 fold n-hexane and adding the resulting $POCl_3$ solution dropwise in small aliquots to the SPI solution while maintaining pH of the SPI solution at 10.0 to 11.0 with 5N NaOH. The relationship between the amount of $POCl_3$ (the molar ratio of $POCl_3$ to SPI, the molecular weight of SPI was calculated by taking it to be the same as that of 11S protein, i.e., 360,000) and the phosphorylation degree (P/N or P/SPI ratio) was illustrated in FIG. 1. This phosphorylation reaction was completed within 30 minutes and any further progress of phosphorylation was not observed.

After phosphorylation, n-hexane was separated from the reaction mixture with a separating funnel and low molecular weight materials such as free phosphoric acid and other contaminants were removed by gel filtration using Sephadex G-50 column or by dialysis to obtain a solution of the desired phosphorylated SPI (hereinafter referred to as P-SPI).

Characteristics of P-SPI (1) Phosphorylation degree

The phosphorylation degree can be expressed by P/N or P/SPI ratio. P/N or P/SPI ratio can be determined by measuring phosphorus content and nitrogen or protein content of a sample. The nitrogen or protein content can be measured by colorimetry using Bio-Rad reagent according the method described by M. M. Bradford, Anal. Biochem., 72, 248 (1976). The calibration curve can be prepared by measuring nitrogen content in a SPI solution according to Kjeldahl method. In case of using P/SPI ratio, the value of Kjeldahl nitrogen×6.25 is employed. The total phosphorus content can be measured by wet combustion according to the method described by R. W. Keenan et al., Anal. Biochem., 23, 555 (1968). When determining P/N or P/SPI ratio, free phosphoric acid and free amino acids in the sample should be removed as much as possible. Therefore, in this Example, P/N or P/SPI ratio of P-SPI was determined by using the above P-SPI solution obtained after gel filtration or dialysis.

As mentioned in the above, P/N ratio of the phosphorylated soybean protein of the present invention should be not less than 25 μg/mg nitrogen. However, as is seen from FIG. 1, usually, the maximum P/N ratio is about 90 to 95 μg/mg nitrogen.

(2) Mode of bonding between phosphoric acid and soybean protein

P-SPI was resistant to hydrolysis with Pronase E (a commercially available protease) and the phosphorylated amino acid residues remained in the form of oligopeptides. The sample used in the hydrolysis was P-SPI obtained by addition of 0.26 ml of $POCl_3$ per 1 g (dry weight) of SPI (hereinafter referred to as P-SPI sample). The hydrolysis was carried out by adding 1 M borate-HCl buffer (pH 7.0, 1 ml) and 2 mg/ml Pronase E solution (0.5 ml) to 10% aqueous P-SPI solution (2 ml) and incubating the mixture at 37° C. for 6 hours.

Figure 2:
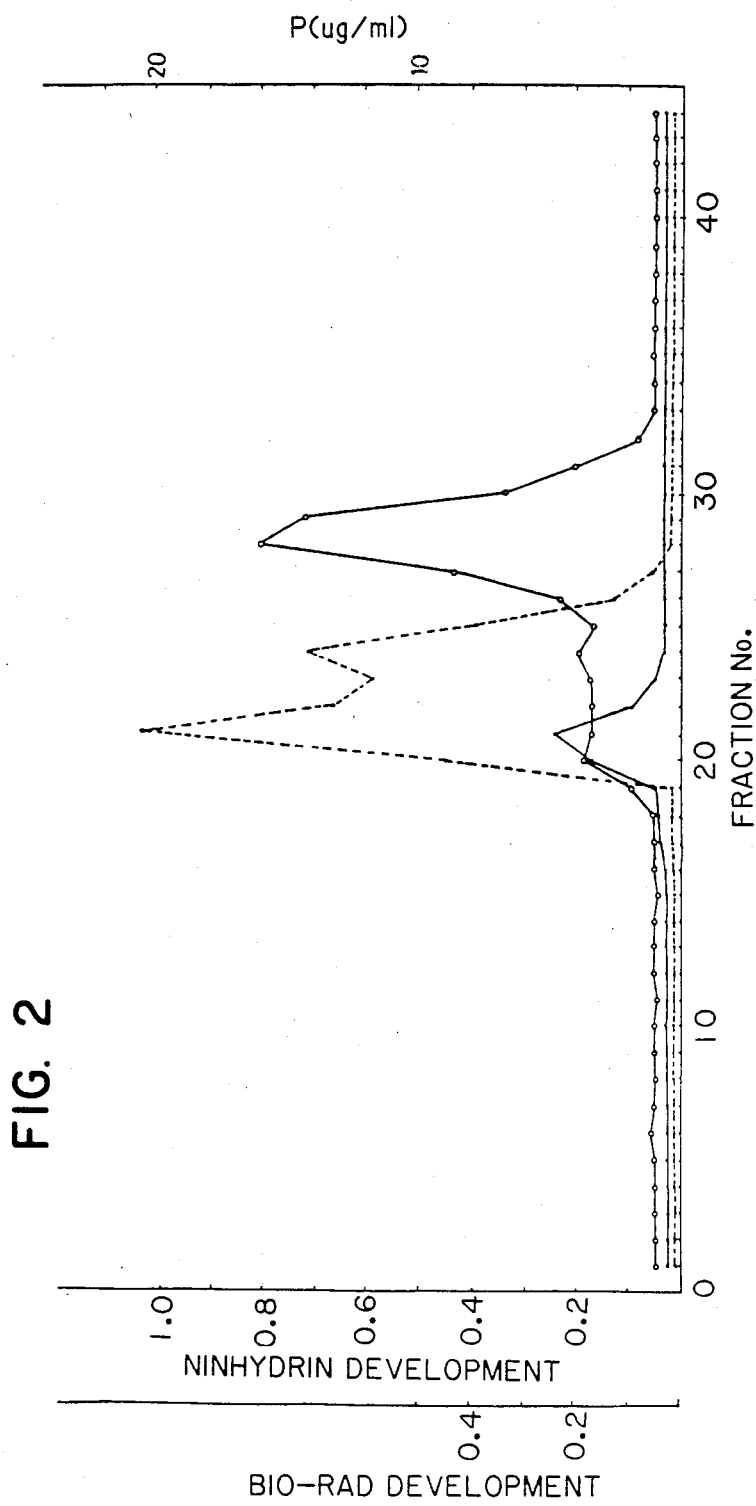
FIG. 2 is a gel chromatogram of a hydrolyzed sample of the phosphorylated soybean protein obtained in Example.

The hydrolyzate of P-SPI sample was applied to a Sepahdex G-10 column (2.0×40 cm) equilibrated with 10 mM borate-HCl buffer (pH 7.0). The flow rate was 1.0 ml/min and each 2 ml fraction was collected. Protein, oligopeptides, amino acids and phosphorus in each fraction were determined according to ninhydrin test and the above Bradford's and Keenan et al's methods. The resulting chromatograms are shown in FIG. 2. In FIG. 2, ●—● represents protein determined by Bio-Rad, ○—○ represents amino acids determined by ninhydrin and ○--○ represents phosphorus. As is seen from FIG. 2, phosphorus was detected in the Bio-Rad positive fraction (Fraction No. 21) and the oligo-peptide fraction (Fraction No. 24), whereas phosphorus was not detected in the amino acid fractions (Fraction No. 28 and subsequent fractions).

Further, the fraction which was resistant to hydrolysis with Pronase E was mainly composed of lysine (Lys) and histidine (His) residues of P-SPI, not serine (Ser) residue. The results of the amino acid analysis of both P-SPI sample and the starting SPI hydrolyzed with Pronase E are shown in Table 1.

TABLE 1

Amino acid compositions of SPI and P-SPI hydrolyzed with Pronase E

| Amino acids | SPI (mol %) | P-SPI (mol %) | P-SPI/SPI (%) |
|---|---|---|---|
| Lys | 27.7 | 9.3 | 33.5 |
| His | 11.2 | 6.3 | 56.3 |
| Arg | 17.0 | 18.6 | 109.4 |
| Asp | 5.8 | 5.7 | 100.0 |
| Thr + Gln | 26.0 | 26.3 | 100.0 |
| Ser + Asn | 90.5 | 93.4 | 103.2 |
| Glu | 13.2 | 14.4 | 109.2 |
| Gly | 5.0 | 5.2 | 101.0 |
| Ala | 22.9 | 16.6 | 72.5 |
| Val | 37.0 | 36.6 | 99.0 |
| Met | 7.8 | 7.8 | 100.0 |
| Ileu | 34.3 | 29.8 | 90.0 |
| Leu | 52.0 | 51.5 | 100.0 |
| Tyr | 20.0 | 14.9 | 74.5 |
| Phe | 28.0 | 26.3 | 93.9 |

As is seen from Table 1, Lys and His are very low in P-SPI sample (in comparison with SPI, Lys is 33.5% and His is 56.3%), whereas there is no substantial difference in Ser+Asn. When the amino acid analysis was conducted after allowing the hydrolyzate of P-SPI sample to stand in a buffer solution (pH 2.2) for 6 hours, Lys is increased from 9.3 mol % (Table 1) to 12.9 mol % and His is increased from 6.3 mol % (Table 1) to 11.2 mol %.

In the following Table 2, there is shown the results of the amino acid analysis of Fraction No. 24 (oligo-peptide fraction of P-SPI sample) and the starting SPI hydrolyzed with 6N HCl. This hydrolysis was carried out by freeze-drying the sample solution (0.5 ml), hydrolyzing the freeze-dried sample with 6N HCl at 110° C. for 24 hours in an evacuated test tube and then evaporating the reaction mixture at 50° C. to remove HCl.

TABLE 2

Amino acid compositions of Fraction No. 24 and SPI hydrolyzed with HCl

| Amino acids | Fr. No. 24 (mol %) | SPI (mol %) | Fr. No. 24/SPI |
|---|---|---|---|
| Lys | 11.7 | 6.1 | 1.9 |
| His | 2.8 | 2.3 | 1.2 |
| Arg | 2.8 | 6.1 | 0.46 |
| Asx | 15.9 | 12.3 | 1.29 |
| Thr | 4.6 | 4.3 | 1.07 |
| Ser | 6.7 | 6.3 | 1.06 |
| Glx | 25.8 | 18.7 | 1.38 |
| Gly | 5.5 | 8.0 | 0.69 |
| Val | 4.6 | 6.0 | 0.77 |
| Met | 0 | 1.0 | 0 |
| Ileu | 3.0 | 5.3 | 0.57 |
| Leu | 2.5 | 8.3 | 0.30 |
| Tyr | 1.2 | 3.1 | 0.39 |
| Phe | 1.4 | 4.5 | 0.34 |

As is seen from Table 2, Lys and His in the oligo-peptide fraction are higher than those in the starting SPI. (Although Glu and Asp are also higher than those of the starting SPI, it seems possible to consider that these amino acids to be contaminates of amino acid fractions eluting in the subsequent fractions because $POCl_3$ hardly reacts with carboxyl groups of Glu and Asp.)

In Table 3, there is shown the results of the amino acid analysis of P-SPI sample and the starting SPI hydroryzed with HCl according to the same manner as described above.

TABLE 3

Amino acid compositions of SPI and P-SPI hydrolyzed with 6N HCl

| Amino acids | SPI (mmol/ 100 g SIP) | P-SPI (mmol/ 100 g P-SIP) | P-SPI/SPI (%) |
|---|---|---|---|
| Lys | 39.3 | 39.1 | 99.4 |
| His | 15.3 | 14.5 | 105.0 |
| Arg | 37.6 | 37.5 | 100.0 |
| Asx | 74.2 | 76.2 | 102.0 |
| Thr | 26.3 | 26.5 | 99.2 |
| Ser | 37.9 | 38.5 | 98.4 |
| Glx | 113.6 | 115.0 | 98.9 |
| Gly | 48.2 | 50.1 | 96.2 |
| Ala | 41.9 | 41.8 | 100.0 |
| Val | 36.6 | 37.2 | 98.4 |
| Met | 7.8 | 7.8 | 100.0 |
| Ileu | 32.2 | 32.7 | 98.5 |
| Leu | 51.3 | 51.3 | 100.0 |
| Tyr | 19.9 | 19.1 | 96.0 |
| Phe | 27.5 | 27.7 | 100.0 |

As is seen from Table 3, the amino acid compositions of both SPI and P-SPI sample hydrolyzed with HCl are substantially the same. Decrease of Ser and such special amino acid peaks as phosphorserine, etc. are not observed.

In view of these facts, it is apparent that, in the phosphorylated soybean protein of the present invention, phosphoric acid is bonded to the protein mainly at the sites of lysine and histidine residue constituents of the protein, not at the sites of serine residue constituent.

Besides, when the type of the phosphate bonded to the protein was analyzed by using 0.01% solution of P-SPI sample and P-SPI sample hydrolized with HCl according to the method described by B. R. Edmund et al., "Text Book of Inorganic Chemistry", Vol. 6, Part 2, Page 180 (1934), only ortho-phosphoric acid was detected and pyrophosphoric acid and metaphosphoric acid were not detected.

(3) Amino acid composition of P-SPI

The amino acid composition of P-SPI is as shown in the above Table 3.

(4) Electrophoresis pattern

Figure 3:
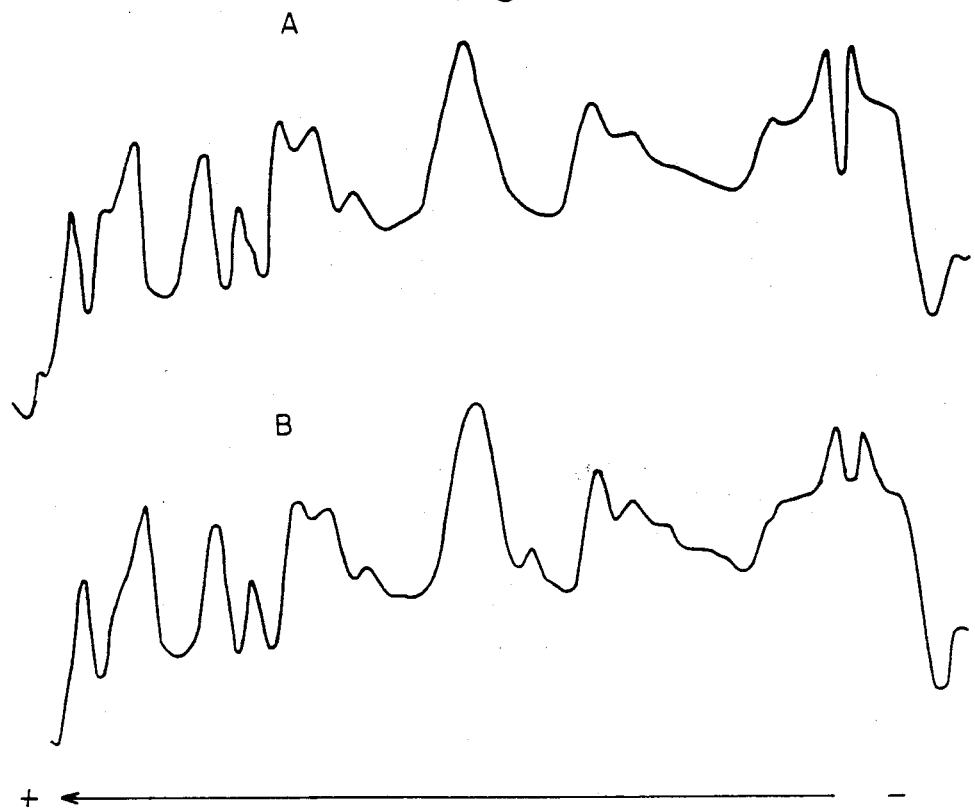
FIGS. 3 to 5 are electrophoresis patterns of both a sample of the phosphorylated soybean protein obtained in Example and the starting SPI detected by a densitometer.

FIG. 3 illustrates the SDS-polyacrylamide gel electrophoresis (SDS-PAGE) densitometer patterns of P-SPI sample (pattern A) and the starting SPI (pattern B). As is seen from FIG. 3, the both patterns A and B are almost the same. That is, the molecular size of P-SPI is almost the same as that of the starting SPI.

Figure 4:
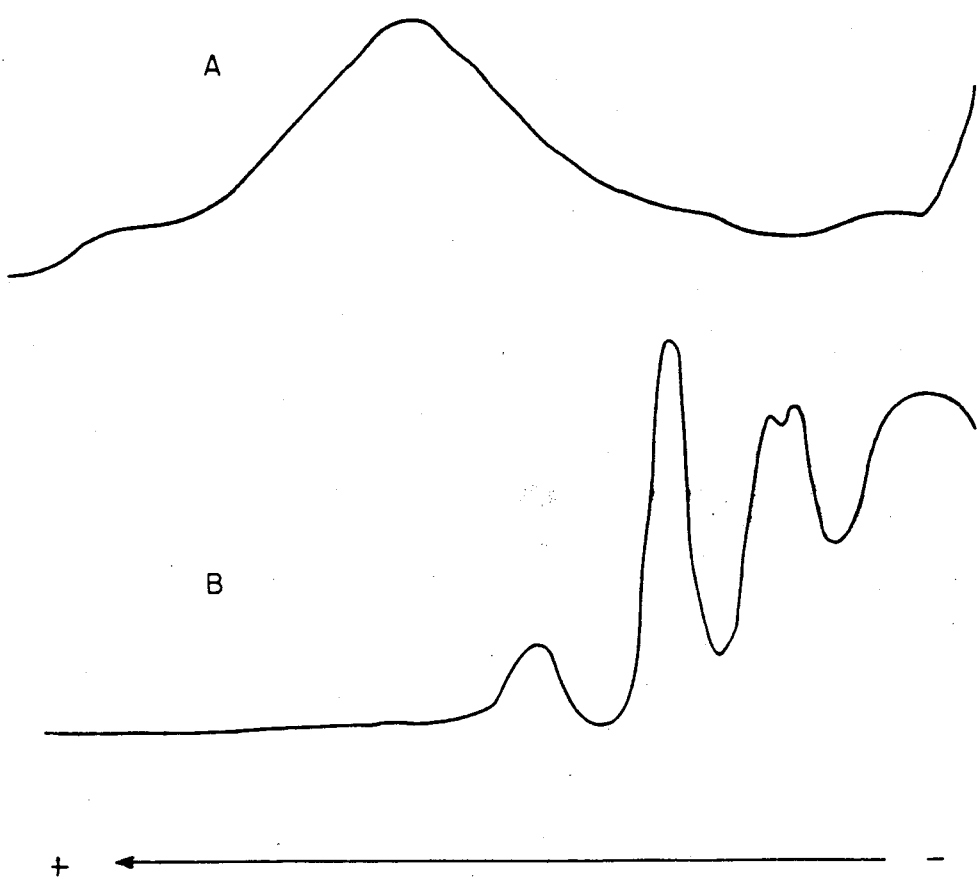
Figure 5:
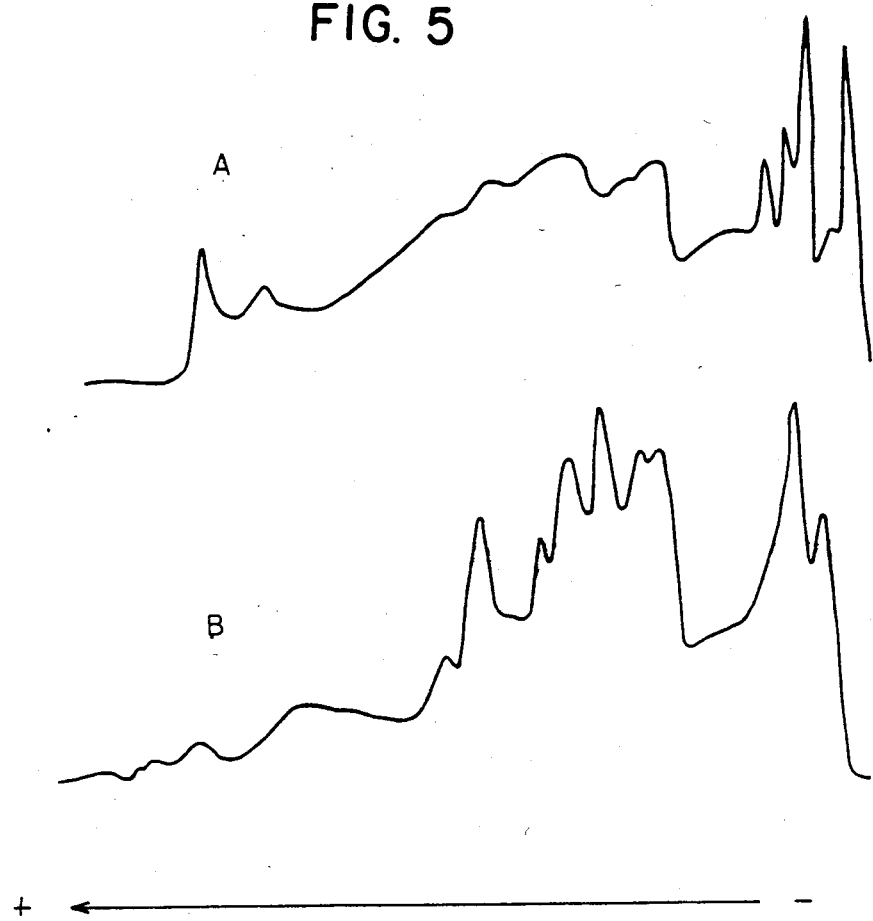

FIGS. 4 and 5 illustrate the polyacrylamide gel electrophoresis (PAGE) and alkali-urea-polyacrylamide gel electrophoresis (AU-PAGE) densitometer patterns of P-SPI sample (pattern A) and the starting SPI (pattern B), respectively. As is seen from FIGS. 4 and 5, both PAGE and AU-PAGE patterns of P-SPI sample move toward the plus side and sharp peaks thereof are generally diminished in comparison with those of SPI. That is, negative charge of soybean protein is generally increased by phosphorylation and molecules having various charge densities are present.

The conditions for the above electrophoresis analysis are as follows:

Dissolution of sample:
PAGE: Buffer solution (pH 6.7).

AU-PAGE: Tris buffer solution (pH 9.0) containing 6M urea and 2-mercaptoethanol (2%).
SDS-PAGE: Phosphate buffer solution (pH 7.2) containing 2-mercaptoethanol (2%) and SDS (0.1%).
Gel composition:
PAGE: 7.5% polyacrylamide (pH 8.9).
AU-PAGE: 7.5% polyacrylamide (pH 9.0) containing 6M urea.
SDS-PAGE: 10% polyacrylamide (pH 7.2) containing SDS (0.1%).
Conditions for electrophoresis:
PAGE: Tris-glycine buffer (pH 8.3), 20° C., 3 hrs.
AU-PAGE: Tris-glycine buffer (pH 8.3), 4° C., 4 hrs.
SDS-PAGE: Phosphate buffer (pH 7.2), 4° C., 5 hrs.
Characteristics of mobility:
PAGE: Depend on charge and molecular weight.
AU-PAGE: Depend on charge and molecular weight. Protein is dissociates into subunits.
SDS-PAGE: Depend on only molecular weight.

EXPERIMENT

Functional properties of P-SPI (1) Solubility and isoelectric point

The solubility of P-SPI in water was investigated at various pH values. As the result, it was found that the solubility of P-SPI in water was very high even at pH 4.5 and the pH range in which the solubility became minimum was pH 3.5 or lower. The isoelectric point electrophoresis of P-SPI also showed that the isoelectric point of P-SPI was pH 3.5 or lower. Particularly, when P/N ratio of P-SPI was more than 50, the isoelectric point of P-SPI was pH 2.5 or lower.

FIG. 6 illustrates the solubilities of various P-SPIs having different phosphorylation degrees at various pH values. The solubility can be expressed by the optical density of 0.1% sample solution containing 50 mM sodium acetate-HCl at 600 nm. Therefore, FIG. 6 shows the optical densities at 600 nm of 0.1% solutions of SPI and various P-SPIs having different phosphorylation degrees containing the buffer at pH 1.5 to 7.5. In FIG. 6, ●—●, ●--●, ○—○, □--□, ○—○ and △—△ represent P/N ratios of 9.4, 12.5, 17.5, 28.1, 61.2 and 89.4 μg/mg nitrogen, respectively. Further, the data shown in FIG. 6 are tabulated in Table 4.

TABLE 4

| P/N (μg/mg) | | 9.4 | 12.5 | 17.5 | 28.1 | 41.3 | 46.3 | 61.3 | 75.0 | 89.4 |
|---|---|---|---|---|---|---|---|---|---|---|
| P/SPI (μg/mg) | | 1.5 | 2.0 | 2.8 | 4.5 | 6.6 | 7.4 | 9.8 | 12.0 | 14.3 |
| Introduced P (mol P/mol SPI) | | 0 | 5.8 | 15.1 | 35.0 | 59.5 | 68.0 | 96.3 | 121.6 | 150.8 |
| pH | 1.5 | 0.12 | 0.13 | 0.58 | 0.61 | 0.60 | 0.56 | 0.61 | 0.65 | 0.69 |
| (OD at | 2.5 | 0.15 | 0.12 | 0.68 | 0.65 | 0.70 | 0.72 | 0.74 | 0.70 | 0.62 |
| 600 nm) | 3.5 | 0.79 | 1.14 | 1.35 | 1.05 | 1.05 | 1.05 | 0.70 | 0.25 | 0.13 |
| | 4.5 | 1.24 | 1.35 | 1.30 | 0.46 | 0.41 | 0.39 | 0.26 | 0.14 | 0.14 |
| | 5.5 | 1.02 | 1.07 | 0.56 | 0.35 | 0.28 | 0.30 | 0.15 | 0.14 | 0.15 |
| | 6.5 | 0.25 | 0.20 | 0.20 | 0.20 | 0.15 | 0.14 | 0.13 | 0.14 | 0.14 |
| | 7.5 | 0.15 | 0.15 | 0.17 | 0.15 | 0.15 | 0.15 | 0.15 | 0.14 | 0.14 |

As is seen from FIG. 6 and Table 4, when SPI is phosphorylated and P/N ratio reaches to about 25 μg/mg nitrogen, the turbidity at pH 4.5 is remarkably decreased (i.e, solubility is increased). When P/N ratio reaches to about 50 μg/mg nitrogen, the pH range in which the maximum turbidity is observed (the isoelectric point) is lowered to about pH 2.5 or lower.

(2) Stability

P-SPI (P/N ratio immediately after preparation: 92.5 μg/mg) was dialyzed against 10 mM Tris-NaOH or 10 mM sodium acetate-HCl buffer at pH 1.5 to 11.0 for 1 to 14 days to remove low molecular materials and P/N ratio was measured. The results are shown in Table 5.

TABLE 5

| pH | Dialysis (days) | P/N ratio (μg/mg nitrogen) |
|---|---|---|
| 11.0 | 1 | 93.7 |
| | 5 | 87.5 |
| | 14 | 87.5 |
| 7.5 | 1 | 90.0 |
| | 5 | 82.5 |
| | 14 | 80.0 |
| 5.0 | 1 | 91.3 |
| | 5 | 78.1 |
| | 14 | 62.5 |
| 4.5 | 1 | 89.4 |
| 3.5 | 1 | 86.3 |
| 2.5 | 1 | 35.0 |
| 1.5 | 1 | 38.8 |

As is seen from Table 6, the bonding between phosphate and SPI was very stable at pH 5.0 to 11.0. At pH 2.5 or lower, the bonding becomes labile.

(3) Emulsification activity

Emulsification activities of SPI and various P-SPIs having different phosphorylation degrees were determined at pH 4.5 and 6.5 according to the method described by J. E. Kinsella, J. Am. Oil. Chemists, Soc., 56, 242 (1979). The results are shown in Table 6. In Table 6, the data are expressed as relative values compared with the starting SPI emulsified at pH 6.5.

TABLE 6

| P/N ratio (μg/mg) | | pH 4.5 | pH 6.5 |
|---|---|---|---|
| 9.4 | (starting SPI) | 0 | 100 |
| 12.5 | | 0 | 98 |
| 17.5 | | 56 | 103 |
| 61.3 | } P-SPI of the present invention | 122 | 130 |
| 89.4 | | 125 | 130 |

As is seen from Table 6, no emulsification activity is found in SPI at pH 4.5, whereas P-SPI of the present invention exhibits excellent emulsification activity even at pH 4.5 as well as at pH 6.5.

(4) Precipitation by $Ca^{2+}$

It is known that SPI is precipitated by $Ca^{2+}$. The precipitation behavior of P-SPI against $Ca^{2+}$ was examined by preparing 0.1% solution of SPI or P-SPI in 50 mM Tris-HCl buffer (pH 7.5), adding thereto $CaCl_2$ in a concentration of 1 to 100 mM and measuring the optical density (turbidity) at 600 nm. The results are illustrated in FIG. 7. In FIG. 7, ——, ●--●, ●—●, ○—○ and ○—○ represents P-SPIs having P/N ratios of 9.4, 12.5, 17.5, 61.3 and 89.4 μg/mg nitrogen, respectively.

As is seen from FIG. 7, P-SPI of the present invention resists to formation of precipitate by $Ca^{2+}$. Since P-SPI of the present invention is highly resistant to precipitation by $Ca^{2+}$, for example, it is useful for various acidic beverages enriched with calcium ion.

(5) Digestibility

Artificial digestion tests were carried out by using 1% solutions of SPI and P-SPI according to the method described by T. Matoba et al., Agri. Biol. Chem., 46 (2), 46 (1982). The first digestion (hydrolysis) was carried out with pepsin at 37° C., at pH 2.0 for 3 hours. The second hydrolysis was carried out with pancreatin at 37° C., at pH 7.5 for 20 hours. The third hydrolysis was carried out with aminopeptidase and prolidase at 37° C., at pH 7.5 for 24 hours. As the internal standard, norleucine was used. Amino acid compositions of P-SPI and SPI hydrolyzed with these digestive enzymes were the same. The results are shown in Table 7.

TABLE 7

Amino acid compositions of SPI and P-SPI hydrolyzed with digestive enzymes

| Amino acids | SPI (mmol/ 100 g SIP) | P-SPI (mmol/ 100 g P-SIP) | P-SPI/SPI (%) |
|---|---|---|---|
| Lys | 30.6 | 30.8 | 100.0 |
| His | 10.2 | 10.7 | 99.4 |
| Arg | 27.7 | 27.1 | 104.8 |
| Asp | 27.7 | 27.1 | 104.8 |
| Thr + Glu | 26.3 | 26.2 | 100.0 |
| Ser + Asn | 38.1 | 37.9 | 99.5 |
| Glu | 49.5 | 51.0 | 103.0 |
| Gly | 36.2 | 34.9 | 96.4 |
| Ala | 38.8 | 39.8 | 102.6 |
| Val | 38.3 | 39.3 | 102.6 |
| Met | 7.7 | 8.0 | 103.0 |
| Ileu | 32.1 | 32.2 | 100.0 |
| Leu | 49.0 | 51.0 | 104.1 |
| Tyr | 17.9 | 17.0 | 95.0 |
| Phe | 26.5 | 27.3 | 103.0 |

As is seen from Table 7, even the amino acid residues bonded to the phosphate such as Lys and His are digested to form free Lys, His and phosphoric acid.

In P-SPI of the present invention, the bonding between the phosphate and Lys residues is stable even at pH 3.5 or higher, the bonding is digested by a digestive enzyme. This characteristic is useful for inhibiting the $\epsilon$-$NH_2$ participating reactions such as browning, and the formation of lysinoalanine at an alkali treatment in food processing.

(6) Gel forming ability

4% Solutions of P-SPI sample and SPI were heated at 100° C. for 2 minutes, cooled quickly, freezed by liquid nitrogen and then freeze-dried overnight by a vacuume freeze drier. Each 0.6 g portion of these freeze dried samples and a comercially available soybean protein isolate powder was added to 2.5% NaCl solution (4.4 ml) containing 50 mM sodium acetate-HCl buffer (concentration of P-SPI or SPI: 12% pH 4.5 to 6.5). After defoaming, the resulting mixture was heated at 80° C. for 30 minutes and then cooled with water to obtain a gel. A gel sample 10 mm long was cut from the resulting gel and its hardness (relative 12% gel strength) was measured by using a texturometer equipped with a 15 mm diameter plunger at 10 V. The results are illustrated in FIG. 8. In FIG. 8, o—o, ●—● and ⋄--⋄ represent P-SPI, SPI and the commercially available soybean protein isolate powder, respectively.

As is seen from FIG. 8, P-SPI of the present invention shows similar gel forming ability at both a neutral and an acidic pH ranges. Further, P-SPI of the present invention has freeze resistance superior to that of SPI.

What is claimed is:

1. A phosphorylated soybean protein which comprises soybean protein and ortho-phosphate bonded to lysine and histidine residue constituents of the soybean protein, the ratio of bonded phosphorus to nitrogen in the soybean protein being 25 μg/mg nitrogen or more and the isoelectric point of the phosphorylated soybean protein being pH 3.5 or lower.

2. A phosphorylated soybean protein according to claim 1, wherein the ratio of bonded phosphorus to nitrogen in the soybean protein being 25 to 95 μg/mg nitrogen.

3. A phosphorylated soybean protein according to claim 1, wherein the isoelectric point is pH 3.5 to 1.5.

* * * * *